(12) United States Patent
Oh

(10) Patent No.: US 6,337,555 B1
(45) Date of Patent: Jan. 8, 2002

(54) MANAGE SYSTEM OF RECHARGEABLE BATTERY AND A METHOD FOR MANAGING THEREOF

(76) Inventor: Se Kwang Oh, 1-303 Hyundai Villa 172, Sangil-Dong, Kangdong-Ku, Seoul (KR)

( * ) Notice: Subject to any disclaimer, the term of this patent is extended or adjusted under 35 U.S.C. 154(b) by 0 days.

(21) Appl. No.: 09/635,688

(22) Filed: Aug. 10, 2000

Related U.S. Application Data

(63) Continuation-in-part of application No. 09/503,250, filed on Feb. 14, 2000.

(30) Foreign Application Priority Data

Feb. 12, 1999 (KR) .................................. 99-5042

(51) Int. Cl.$^7$ .................................................. H02J 7/00
(52) U.S. Cl. ........................................ 320/107; 320/126
(58) Field of Search ........................ 320/107, 126; 429/96, 97, 98, 99, 100

(56) References Cited

U.S. PATENT DOCUMENTS

| 3,980,940 A | | 9/1976 | Mabuchi et al. ............ 320/107 |
|---|---|---|---|
| 5,356,343 A | * | 10/1994 | Lovetere ....................... 472/57 |
| 5,387,857 A | * | 2/1995 | Honda et al. ................. 320/120 |
| 5,760,570 A | * | 6/1998 | Nagai et al. .................. 320/162 |
| 5,955,868 A | * | 9/1999 | Kaite et al. .................. 320/119 |
| 6,084,382 A | * | 7/2000 | Hite ............................. 320/116 |

* cited by examiner

*Primary Examiner*—Peter S. Wong
*Assistant Examiner*—Lawrence Luk

(57) ABSTRACT

The present invention illustrates about the managing device for batteries which expands the durability of batteries and enhances the charging effect by maintaining the termination voltage of the rechargeable batteries used in all kinds of electrical devices and managing method for rechargeable battery thereof. The present invention provides a managing system for rechargeable batteries comprising a plurality of cells, a closed loop circuit method which connects the cells in parallel connection electrically, an electrical load means having regular voltage which is the sum of the maximum output voltage among the plurality of cells and being in parallel connection with the rechargeable cells which are connected in parallel with the closed loop circuit method, a switching means inserted between the plurality of cells and the electrical load means in order to cut off the current flowing in the electrical load means in case it reaches the discharge termination voltage of the plurality of rechargeable cells.

10 Claims, 5 Drawing Sheets

MANAGE SYSTEM OF RECHARGEABLE BATTERY AND A METHOD FOR MANAGING THEREOF

This application is a continuation in part (CIP) of 09/503,250, filed Feb. 14, 2000.

BACKGROUND OF THE INVENTION

1. Field of the Invention

The present invention relates to a management system of rechargeable battery (or secondary cell, storage battery) system and a method for managing thereof. Especially, the present invention relates to a system and a method for managing a rechargeable battery which is used in various portable electrical equipment such as a wireless radio, an audio tape player, a camera, an electric lamp and so on wherein the termination voltage is equalized using parallel discharging method before charging the rechargeable battery so that the durability of the rechargeable battery is expanded and the efficiency of the charging is enhanced.

2. Description of the Background Art

The rechargeable battery so called a secondary battery or a storage battery is being produced and sold in various types and sizes. The typical type of the rechargeable battery is a nickel cadmium (NiCd) type, a lead-acid type, a nickel metal hydride (NiMH) type, a lithium ion (Li-ion) type, a lithium polymer type, an alkaline type and so on according to its components. These rechargeable batteries should be charged using the appropriate charging method in order to be used for full durability. For example, the NiCd type is preferred to be fully discharged periodically before using it. The Li-ion type used in notebook computers video cameras, mobile telephones and so on is preferred to be charged before it is discharged up to the discharge terminal voltage. The lithium polymer type used in the small electrical devices, the medical equipment, computers and so on, should be always in a charged state before it is exhausted by discharge. The durability of the lithium polymer type could be shortened, if it is fully discharged like nickel cadmium type. As mentioned above, despite the difference in usage direction according to the different types, many rechargeable batteries are not used for full durability and wasted as the users misuse them. The wasted rechargeable batteries are one factor of the environmental pollution, especially, the Ni—Cd type battery causes a serious environmental problem as there is toxic in the cadmium. Many countries use their budget and carry out the educational campaign for collecting the used batteries. Furthermore, wasting of the rechargeable batteries is a dissipation of the natural resource.

Hereinafter, we will explain about the Ni—Cd and NiMH type chargeable batteries which are deeply related with the present invention. Because the Ni—Cd type costs less and is easy to store and deliver as well as being rechargeable in a short time, it is still used in many fields even though it was developed long time ago. Furthermore, it is the best kind of the rechargeable battery in the industrial field because the discharging energy per time is big, the durability is long and it can be recharged many times than others. It is applied to electrical devices which need big electrical energy such as a flash of a camera, a cordless telephone, a radio, a satellite auxiliary battery, a motor driver, a portable and wireless vacuum cleaner, a diving light, a radio controlled model (car, airplane and ship) and so on. If the Ni-type battery is recharged without deep discharging, the recharging time is reduced because of the memory effect in which the rechargeable capacitance is reduced by crystalizing the un-reacted active materials. Generally, the rechargeable batteries are used in serial connection with many cells except for the case of using only one cell. In this case, the cells are discharged so that they are in a different energy state. After the cells are used in a serial connection so that, they are discharged in different energy states, the energy state of the cells also become different if they are recharged. If the group of the cells are discharged and recharged many times, then the termination voltage of some cells could be lower than 0.1 volt. In this state, if the user further uses these cells, then the electrical potential is reversed so that these cells are in the battery reversal state. If the secondary battery which comprises many rechargeable cells having different energy states are connected in serial is recharged, then the recharging is stopped when one cell having the most high energy state sends the termination signal of recharging to the charger despite the cell having the lowest energy state is not charged yet. On the other hand, in the case of the secondary battery including an over discharged cell, the other cells reach over charged state before the over discharged cell is completely charged. That is, the status of some cells comprised in the secondary battery moves back and forth between the uncompleted charging state and the over discharging (or battery reversal) state. At the same time, the status of the other cells move back and forth between the completed charging state and the uncompleted discharging state. Therefore, all the cells are damaged.

The performance of the Ni-type rechargeable battery can be enhanced by deep discharging periodically so that the crystallized electrolytes are removed. However, the secondary battery generally comprises many cells connected in serial in order to obtain the wanted electric voltage for using the electrical device. Under this state, if the secondary battery is discharged for management, then some cells of the secondary battery can be over discharged or be in the battery reversal state. That is, it is hard to recover or to equalize the cells using the discharging method in the serial connection. In order to solve the above problem, the individual discharging method is suggested in the U.S. Pat. No. 3,980,940, as shown in FIG. 1. This conventional invention suggests a method for managing the secondary battery in which the cells are equalized by deep discharging individually before they are recharged in serial connection. The rechargeable batteries (cells) $1a$, $1b$, $1c$ and, $1d$ are connected in serial connection. The recharging means 11 is connected to the rechargeable batteries $1a$ to $1d$. The discharging means 21 comprising the electrical load means $23a$, $23b$, $23c$ and $23d$ and discharging blocking switch $25a$, $25b$, $25c$ and, $25d$ is connected with the rechargeable batteries $1a$ to $1d$ individually. That is, the electrical load means $23a$ to $23d$ and the discharging blocking switch $25a$ to $25d$ are connected to the rechargeable batteries $1a$ to $1d$, respectively. In this conventional invention, each cell $1a$ to $1d$ is discharged individually using the discharging means 21 after the cells are recharged in serial connection using the recharging means 11. However, according to the conventional invention, the amount of the energy wastes during individual discharging is very big and it takes a long time to discharge all the cells in different energy state should be fully discharged.

SUMMARY OF THE INVENTION

There is a need for a system and a method in which the rechargeable batteries are equalized without the deep discharging of each battery. After that, the charging can be performed for a shorter time period. One object of the present invention is to provide a system and a method for managing the rechargeable batteries in which they are protected from the being damaged due to over discharge or over charge by equalizing the energy difference of the each rechargeable battery. Another object of the present invention is to provide a system and a method for managing the chargeable batteries in which the rechargeable batteries are discharged in parallel connection for equalizing the energy states of the each battery and then they are recharged in serial connection, so that the discharging efficiency is maximized and the charging is performed quickly.

In order to obtain these objects, the present invention provides a managing system for rechargeable battery comprising a plurality of a rechargeable unit batteries, a closed loop circuit method which connects the cells in parallel connection electrically, an electrical load means having regular voltage which is the sum of the maximum output voltage among the plurality of cells and being in parallel connection with the rechargeable cells which are connected in parallel with the closed loop circuit method, a rechargeable battery manager including a discharging blocking switch inserted between the plurality of cells and the electrical load means in order to cut off the current flowing in the electrical load means in case it reaches the discharge termination voltage of the plurality of rechargeable cells. In addition, the present invention provides a method of managing the rechargeable battery including a step of discharging for a certain time period by parallel connecting the plurality of rechargeable cells which have different energy level using the battery manager for discharging. The present invention also provides a plurality of rechargeable cells, a closed loop circuit means connecting the rechargeable cells, a selection switch connected to the closed loop circuit means which allows the cells to be connected either by parallel connection or serial connection, an electrical load means having regular voltage which is the sum of the maximum output voltage among the plurality of cells and being in parallel connection with the rechargeable cells which are connected in parallel with the closed loop circuit method and a manager for rechargeable battery including a voltage applying means which provides rechargeable voltage between the both electrodes of the cells connected in the serial connection in case the cells are in serial connection at the same time the current flowing in the electrical load means is cut off by the switch means. Finally, the present invention provides a managing method for rechargeable batteries including steps of discharging the plurality of rechargeable cells which have different energy level for a certain time period by connecting them in parallel connection using the manager for chargeable cells and charging the plurality of the rechargeable cells by connecting them in serial connection after the above mentioned parallel discharge.

BRIEF DESCRIPTION OF THE ATTACHED DRAWINGS

DETAILED DESCRIPTION OF THE PREFERRED EMBODIMENTS

Figure 1:
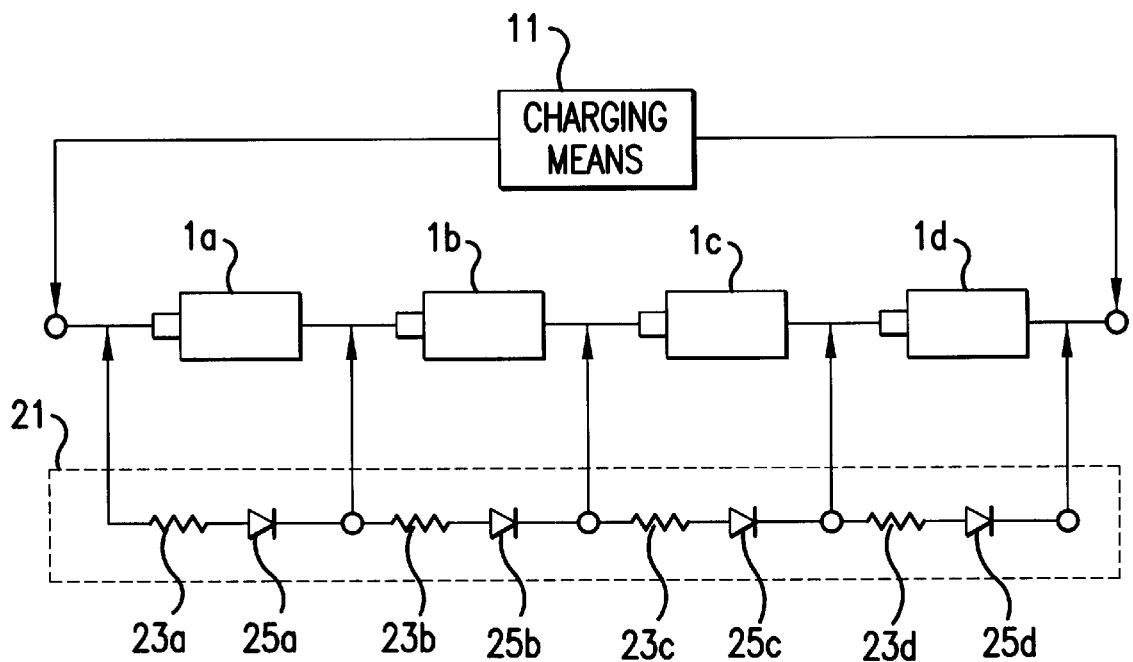
FIG. 1 is a illustration showing a method and a system of recharging the rechargeable battery individually after fully discharging by using the conventional method of individual discharging method.

Detailed description of the present invention will be described hereinafter with the preferred embodiments referring to the drawings.
Preferred Embodiment 1

Figure 2A:
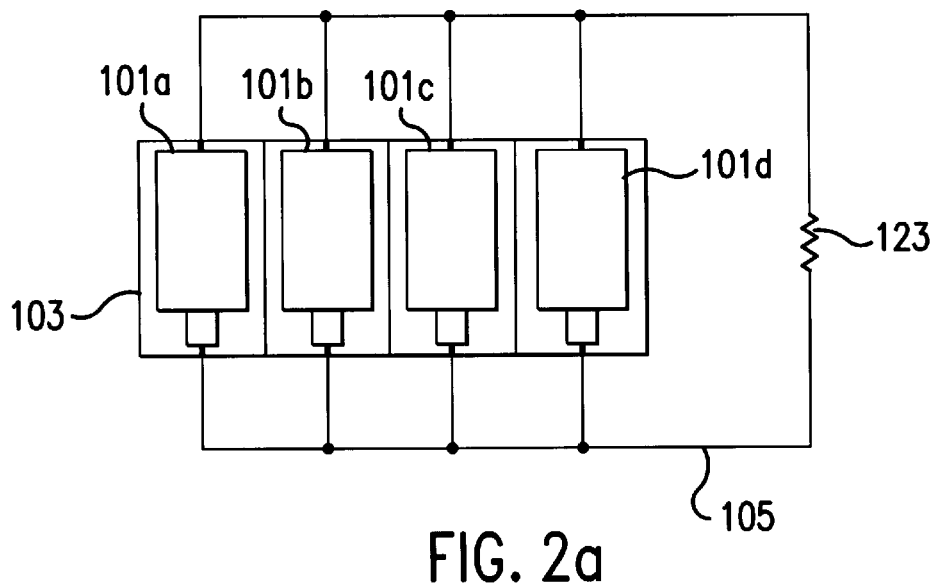
FIG. 2a is an illustration showing a method and a system of managing the rechargeable batteries by parallel discharging according to the present invention.
Figure 2B:
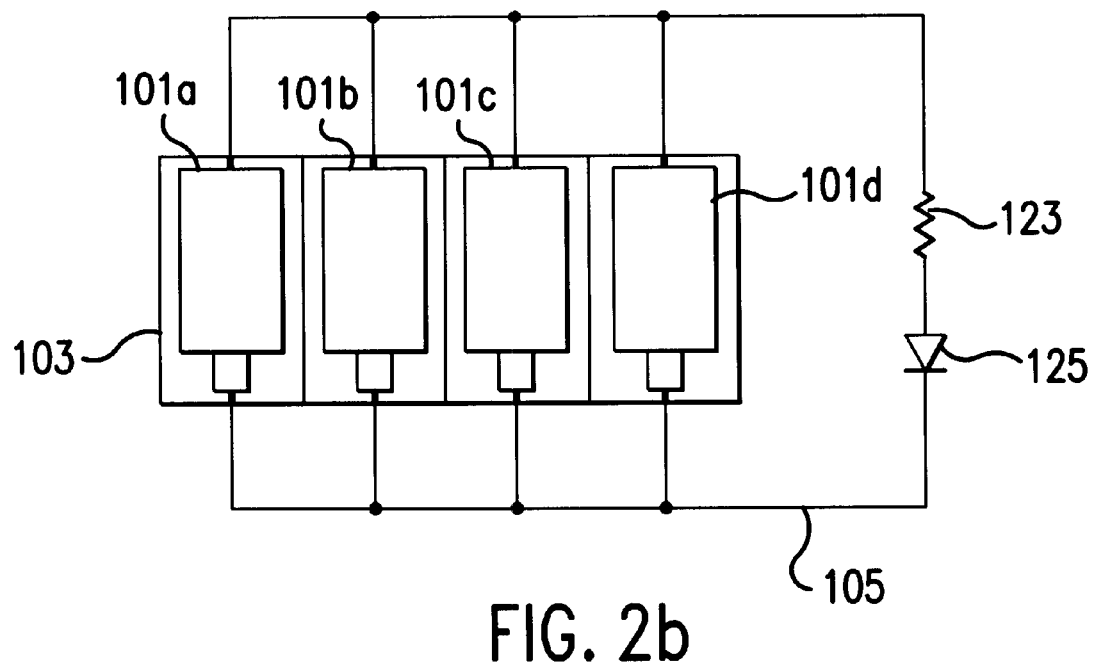
FIG. 2b is an illustration showing a method and a system of managing the rechargeable batteries by parallel discharging using a diode switch to block over discharging.
Figure 2C:
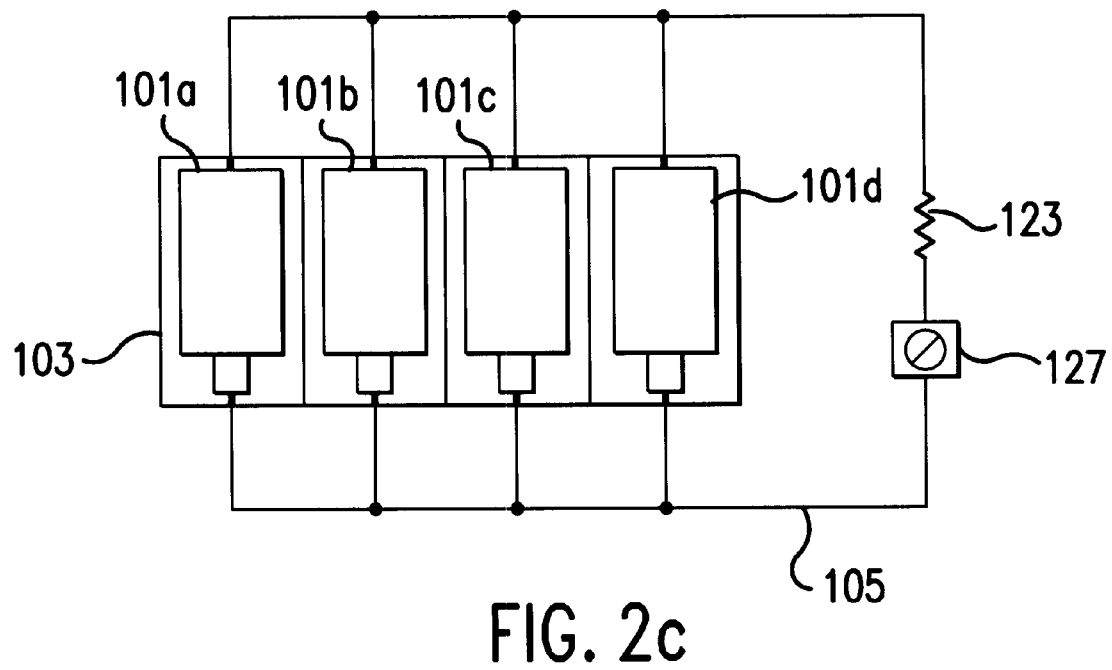
FIG. 2c is an illustration showing a method and a system of managing the rechargeable batteries by parallel discharging using a timer to block over discharging.

The FIG. 2a is a view showing a manager for the rechargeable battery according to the present invention. It shows the core scope of the present invention which is the managing module and the managing method thereof in order to have equalization of the rechargeable battery by the parallel connection. A rechargeable battery, in other words, a secondary battery comprising at least one or more cells to be one group, is concerned in this preferred embodiment. In general, the secondary battery connects two, three, four, five, six, eight or ten cells in serial connection and is used in order to obtain the suitable electromotive force which is acceptable for the device to be used. In this preferred embodiment, a case of using four cells 101a, 101b, 101c and 101d which are used commonly in digital camera, a flash of camera, under water diving flash lights and toys is described. In case at least one of the cells 101a, 101b, 101c and 101d reaches the discharge termination voltage when the secondary battery is applied to a device, it needs to be recharged. After separating the cells 101a, 101b, 101c and 101d from the devices, connect the cells in parallel connection. Then, connect the electrical load means 123 having the regular voltage corresponding to the electromotive force of the cell between both electrodes of the cells 101a, 101b, 101c and 101d connected in parallel with the cells 101a, 101b, 101c and 101d in parallel connection. As a result, each of the cells 101a, 101b, 101c and 101d comprising the secondary battery discharges simultaneously. The cells 101a, 101b, 101c and 101d comprising the commonly used secondary battery have different voltage state. Therefore, if discharging is carried out after connecting them in parallel connection, the equalization, in other words, the voltage and the discharge of each of the cells 101a, 101b, 101c and 101d being identical is achieved. After each of the cells are equalized by carrying out the parallel discharge for a certain period of time, charge the cells by connecting to the serial charging circuit. Time consumed in managing the chargeable battery by using parallel discharge can differ according to the condition of the secondary battery. It is usually preferred to take the time consumed until the reaching the discharge termination voltage of the secondary battery connected in parallel as the managing time. Therefore, a silicon diode 125 having minimum through voltage (threshold voltage) corresponding to the sum of the discharge termination voltage of the secondary battery can be used by connecting it with the cells 101a, 101b, 101c and 101d in parallel as shown in FIG. 2b., In another method, a timer 127 is installed in order to control the discharging time artificially as shown in FIG. 2c. According to our experience, effective management can be obtained by discharging 3 to 5 minutes when the discharge ratio is 1C to 2C (1C means charging or discharging its capacitance in an hour).

The rechargeable battery of the present invention basically includes the following elements: a battery holder 103a, 103b, 103c and 103d which can electrically connect the cells 101a, 101b, 101c and 101d, in other words, the plurality of rechargeable battery in order to carry out the managing method of the rechargeable battery. The cells 101a, 101b, 101c and 101d can be used in a serial connection so that they suit electromotive force of the electrical device being used. A closed loop circuit means 105 which connect the cells 101a, 101b, 101c and 101d in parallel connection is included. An electrical load means 123 connected in parallel connection and having regular voltage which suits the electromotive force of the cells between both terminal of the cells 101a, 101b, 101c and 101d in the closed loop circuit means 105 is included. For the electrical load means 123, a device like resistance, bulb and electrical motor which can consume regular voltage corresponding to the electromotive force of the cell is used. A discharging blocking switch 125 which is in serial connection with the electrical load means 123 and in parallel connection with cells 101a, 101b, 101c and 101d in order to prevent further discharge when the parallel connected cells 101a, 101b, 101c and 101d start discharging and finish discharging when it reaches the discharge termination voltage is included. It is preferable to use silicon diode having the minimum through voltage (threshold voltage) corresponding to the discharge termination voltage (in other words, the sum of parallel connection of the discharge termination voltage of each of the cells) of the secondary battery for the discharging blocking switch 125.

Preferred Embodiment 2

Figure 3:
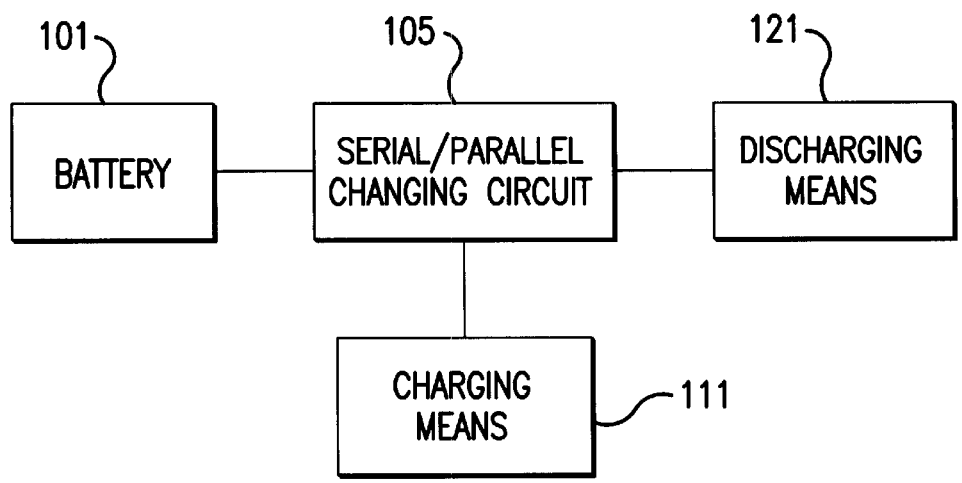
FIG. 3 is a block diagram showing the main concept of the present invention which suggests a method and a system of managing the rechargeable batteries by parallel discharging and serial recharging.

The preferred embodiment 1 illustrates the managing device and the managing method thereof in order to carry out parallel discharge of the rechargeable cells comprising the secondary battery which has been fully used for the purpose of equalization before recharging. In this preferred embodiment, a managing device for the rechargeable battery which includes the charging function and the managing method thereof is illustrated. The FIG. 3 is a view showing the basic concept structure of a managing device for the rechargeable battery according to this preferred embodiment.

A rechargeable battery 101 comprising one or more cells as one group is needed. The chargeable battery 101 is connected to a closed loop circuit 105 which has a switch 107 that can choose between serial connection or parallel connection. It is preferred that the selection switch 107 is connected to a battery condition testing means 109 as the selection whether it is parallel or serial is determined by the voltage condition of the chargeable batteries 101. If the rechargeable batteries 101 are parallel connected by the selection switch 107, make the rechargeable battery to be connected with a discharging means 123 having the regular voltage which corresponds to the electromotive force of one cell between the both terminals of the batteries 101. A timer 127 which can send signal to change the connection of the rechargeable batteries 101 into serial connection after the discharging has been carried out for a certain period of time is preferred to be connected between the selection switch 107 and the discharging means 123. After the parallel discharge is carried out for a certain period of time by the signal of the timer 127, a charging means 111 for recharging the chargeable batteries 101 after transferring into a serial connection by the selection switch 107 is connected to the closed loop circuit 105.

Figure 4:
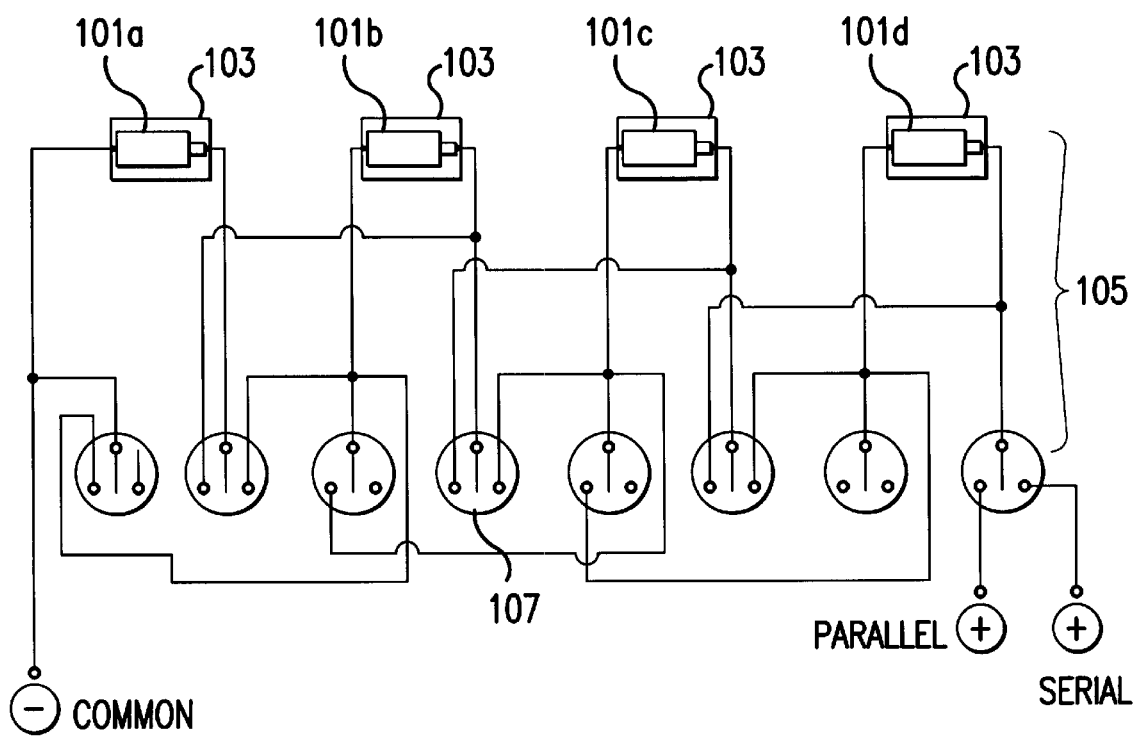
FIG. 4 is a close loop circuit diagram of the present invention.
Figure 5A:
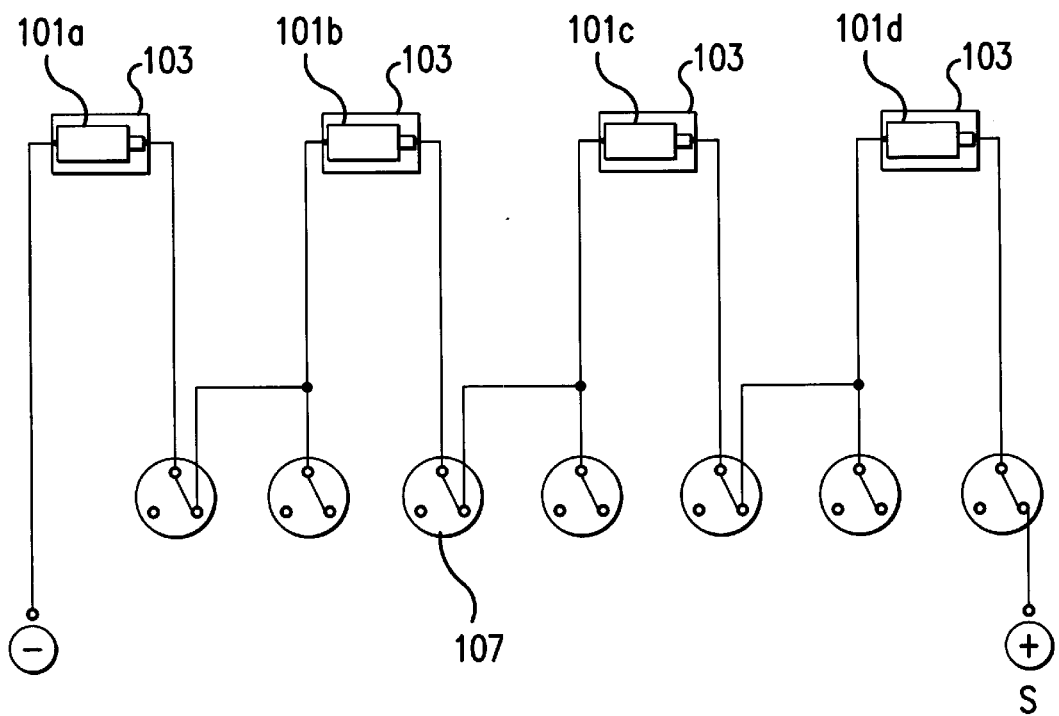
FIG. 5a is an illustration showing circuit in which the cells are connected in parallel by the switch operation.
Figure 5B:
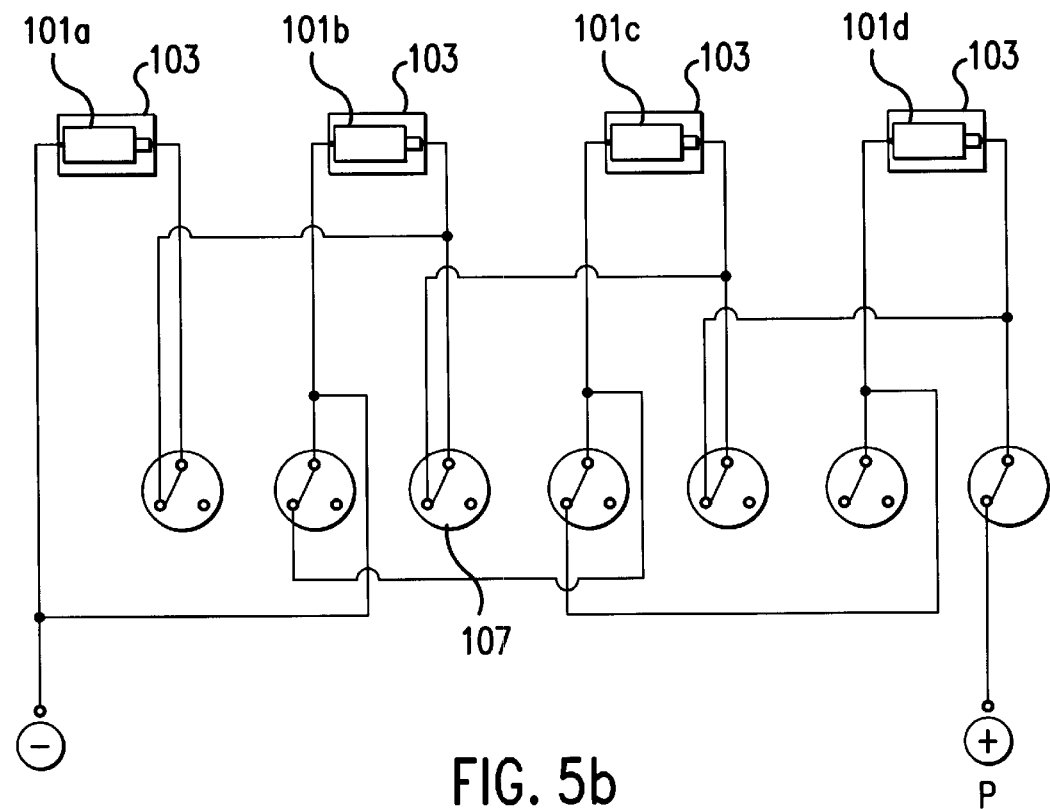
FIG. 5b is an illustration showing circuit in which the cells are connected in serial by the switch operation.

Hereinafter, the concrete example of the present embodiment will be described. A secondary battery comprising one or more cell as one group is needed. In general, the secondary battery connects two, three, four, five, six, eight or ten cells in serial connection in order to obtain a acceptable electromotive force which is suitable for the device to be used. In this embodiment usage of four cells is introduced again as an example for it is used mostly commonly. A battery holder 103a, 103b, 103c and 103d which allows to connect the cells 101a, 101b, 101c and 101d electrically are included. A closed loop circuit 105 which allows the cells 101a, 101b, 101c and 101d to be connected in parallel or in serial by using the conductive wire like an electric wire is connected to the battery holder 103a, 103b, 103c and 103d. A selection switch 107 which chooses either a serial connection or a parallel connection for the cells 101a, 101b, 101c and 101d is included in the closed loop circuit 105. The selection switch 107 can be selected among a rotary switch, relay or a semiconductor element like MOSFET (Metal Oxide Semiconductor Field Effect Transistor). Both terminals of the cells 101a, 101b, 101c and 101d are connected to the charging means 111 if the cells 101a, 101b, 101c and 101d are connected in serial connection and both terminals of the cells 101a, 101b, 101c and 101d are connected to the discharging means 123 if the cells 101a, 101b, 101c and 101d are connected in parallel connection according to the connection of the selection switch 107. The FIG. 4 is a view showing an example of closed loop circuit 105 which is structured to connect either by serial connection or parallel connection. FIG. 5a shows a circuit when the cells are parallel connected by the switch operation and FIG. 5b shows a circuit when the cells are serial connected by the switch operation.

Figure 6:
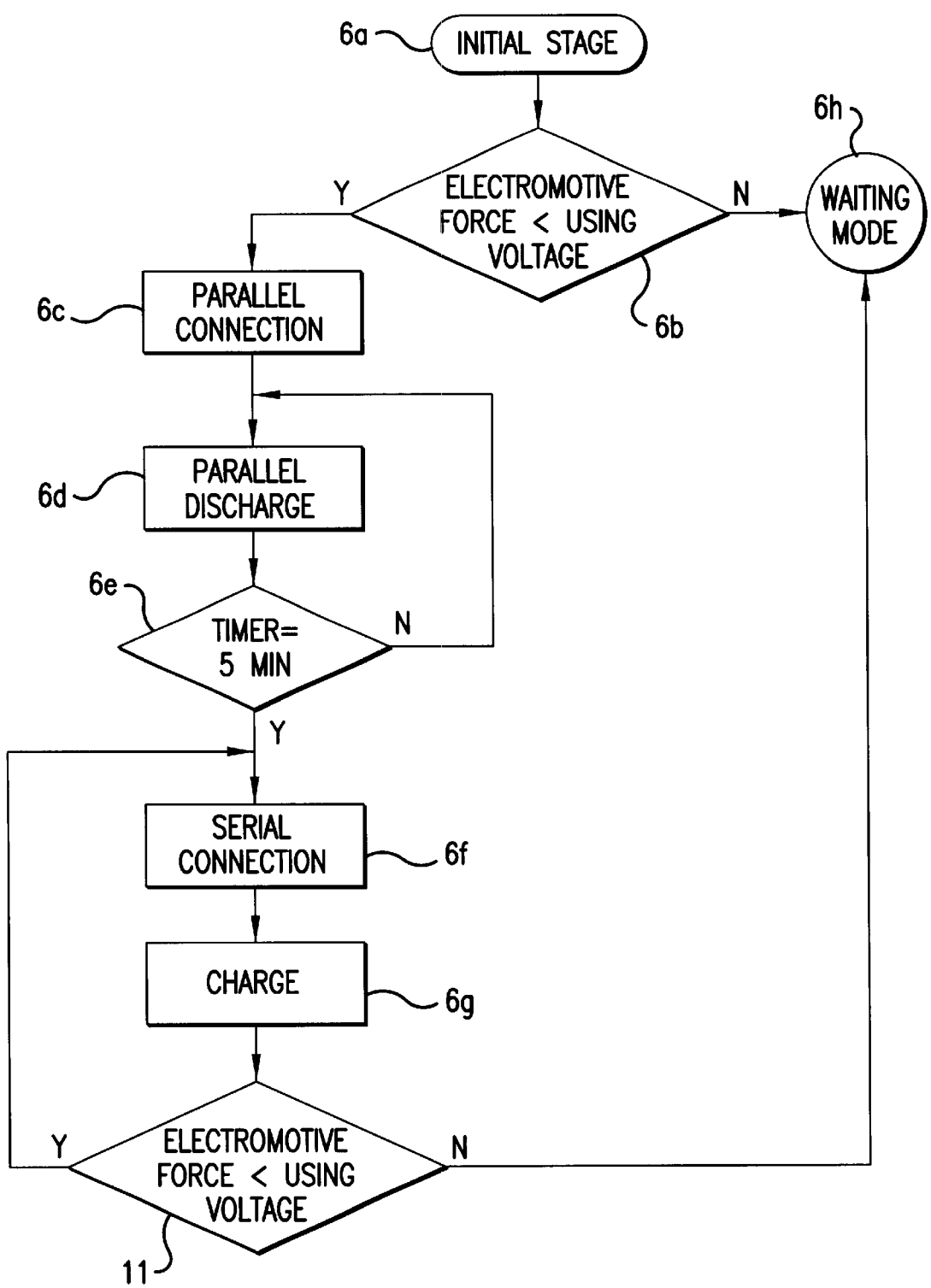
FIG. 6 is an illustration showing the operation condition of the battery managing device according to the present invention.

The managing method using the above mentioned device for managing the rechargeable battery is described in the following. FIG. 6 is a view showing the operation condition of the battery managing device according to the present invention. The closed loop circuit 105 connects the cells 101a 101b, 101c and 101d in serial connection in the initial stage 6a as shown in FIG. 6. Test the electromotive force of the cells 101a, 101b, 101c and 101d which are connected to the closed loop circuit 105 structured in serial and check whether it is lower than the usable voltage or not as shown in state 6b of FIG. 6. If the electromotive force is lower than the usable voltage, the selection switch 107 changes and connects the cells 101a, 101b, 101c and 101d in a parallel connection as shown in state 6c of FIG. 6. Then, the cells 101a, 101b, 101c and 101d are parallel discharged by the discharging means 123 as shown in stage 6d of FIG. 6.

The time consumed in parallel discharge is automatically set up by a timer 127 which is installed between the discharging means 123 and the selection switch 107. It is preferred that the time for discharging is set up to be within 5 minutes considering the time for managing battery as shown in state 6e of FIG. 6. When the signal indicating that the parallel discharging is completed by the timer 127 is transferred to the selection switch 107, the connection of the cells 101a 101b, 101c and 101d are changed into a serial connection as shown in state 6f of FIG. 6. Then, the cells 101a, 101b, 101c and 101d are connected to the charging means 111 in serial connection and recharging is carried out as shown in state 6g of FIG. 6. Keep measuring the electromotive force while charging and if it is same with or higher than the using voltage as shown in stage 6h of FIG.

6, charging is ceased and goes into a waiting mode as shown in stage 6h of FIG. 6.

In case of recharging, in order to carry out the charging in high speed, carry out the parallel discharge for about 3 to 5 minutes for managing and carry out the discharge under the condition of charging ratio of about 3C–4C. As a result, charging is completed within 30 minutes.

The present invention provides the managing device for chargeable battery which charges by connecting the same kinds of chargeable batteries having different energy level in serial connection after carrying out the discharging the parallel connected chargeable batteries and managing method of the chargeable battery thereof. According to the present invention, high speed charging is possible as the chargeable battery is recharged after equalization under the condition of incomplete discharge of the chargeable battery which has same level of energy through parallel discharge. Also, over charged and over discharged rechargeable battery which were thought to be destroyed are recycled during the process of equalization through the parallel discharge. Finally, durability of the chargeable battery has expanded as the management of the battery is repeated even though the number of managing and charging are repeated by the battery managing device according to the present invention.

What is claimed is:

1. A managing device for rechargeable battery comprising:

battery holders which can connect cells electrically;

a closed loop means which connects the battery holders having the cells in parallel connection; and a discharging means which is connected with the parallel connected cells in parallel connection.

2. The managing device for rechargeable battery according to claim 1 wherein the discharging means comprise an electrical load having the regular voltage corresponding to an electromotive force of the cell.

3. The managing device for rechargeable battery according to claim 1 further includes a discharging blocking switch which is connected with the discharging means in a serial connection and which is connected with the cells in parallel connection.

4. The managing device for rechargeable battery according to claim 3 wherein the discharging blocking switch include a diode having the minimum through voltage which corresponds to the sum voltage of discharge termination voltage of the cells which is in parallel connection.

5. A managing device for rechargeable battery comprising:

battery holders which can connect cells electrically;

a closed loop circuit means which enables the battery holders having the cells to be connected at least one of a serial connection and a parallel connection;

a selecting switch which is connected to the closed loop circuit means choose at least one of a serial connection and a parallel connection for the cells;

a discharging means connected with the cells in parallel connection if the cells are in parallel connection; and a charging means connected with the cells in a serial connection if the cells are in a serial connection.

6. The managing device for rechargeable battery according to claim 5 further includes a timer which determines the discharging time when the parallel connected cells are discharged by the discharging means.

7. The managing device for rechargeable battery according to claim 5 wherein the discharging means include an electrical load having the regular voltage corresponding to the electromotive force of the cells.

8. The managing device for rechargeable battery according to claim 5 wherein the selection switch include at least one from a relay, rotary switch and switch element group including a semiconductor switching element.

9. A managing method for rechargeable battery comprising steps of:

parallel connecting at least two cells; and parallel connecting the cells by connecting to the discharging means which has the regular voltage corresponding to the maximum output voltage of the cells and which are connected with the parallel connected cells in parallel connection.

10. A managing method for rechargeable battery comprising steps of: connecting in serial at least two cells;

determining whether the electromotive force of the cells are lower than the usable voltage or not by checking the electromotive force of the cells;

connecting the cells in parallel connection if the electromotive force of the cells is lower than the usable voltage and carrying out the parallel discharge for a predetermined time by connecting to the discharging means; and carrying out recharging by changing the cells into a serial connection state.

\* \* \* \* \*